United States Patent
Hsu (10) Patent No.: US 10,811,200 B2
(45) Date of Patent: Oct. 20, 2020

(54) APPARATUS AND METHODS FOR LATCHING, AND SYSTEMS INCLUDING THE SAME

(71) Applicant: Illinois Tool Works Inc., Glenview, IL (US)

(72) Inventor: Abel Hsu, Kaohsiung (TW)

(73) Assignee: Illinois Took Works Inc., Glenview, IL (US)

( * ) Notice: Subject to any disclaimer, the term of this patent is extended or adjusted under 35 U.S.C. 154(b) by 97 days.

(21) Appl. No.: 15/723,777

(22) Filed: Oct. 3, 2017

(65) Prior Publication Data

US 2018/0108500 A1    Apr. 19, 2018

(30) Foreign Application Priority Data

Oct. 14, 2016 (TW) ............... 105133170 A (51) Int. Cl.
| | |
|---|---|
| *H01H 13/14* | (2006.01) |
| *H01H 13/56* | (2006.01) |
| *H01H 13/04* | (2006.01) |
| *F01L 13/00* | (2006.01) |
| *F16K 31/02* | (2006.01) |

(52) U.S. Cl.
CPC ............ *H01H 13/14* (2013.01); *H01H 13/04* (2013.01); *H01H 13/56* (2013.01); *F01L 13/0036* (2013.01); *F16K 31/02* (2013.01)

(58) Field of Classification Search
CPC ........ H01H 13/04; H01H 13/56; H01H 13/14; F01L 13/0036
USPC ....................................................... 200/308
See application file for complete search history.

(56) References Cited

U.S. PATENT DOCUMENTS

| | | | |
|---|---|---|---|
| 3,512,427 A | | 5/1970 | Metcalf |
| 3,721,789 A | * | 3/1973 | Black ................... H01H 9/16 200/308 |

(Continued)

FOREIGN PATENT DOCUMENTS

| | | |
|---|---|---|
| CN | 102280290 | 12/2011 |
| JP | 09161600 | 6/1997 |

OTHER PUBLICATIONS

Extended European Search Report Appln No. 17195453.0 dated Mar. 20, 2018 (6 pgs).

(Continued)

*Primary Examiner* — Nguyen Tran
*Assistant Examiner* — Iman Malakooti
(74) *Attorney, Agent, or Firm* — McAndrews, Held & Malloy, Ltd.

(57) ABSTRACT

The latching apparatus of the present disclosure includes an actuator configured to change from a first position to a second position; a core connector coupled to the actuator at a first end, and having a cam disposed thereon; and a follower located between the actuator and the cam; wherein the actuator pushes the follower when changing from the first position to the second position, such that the follower engages with the cam on the core connector and causes the cam to rotate an angle to enter a latching state, wherein during the latching state, the core connector configured to hold the actuator secured at the second position. Switch systems and Methods for switching a latching apparatus are also disclosed.

20 Claims, 7 Drawing Sheets

(56) References Cited

U.S. PATENT DOCUMENTS

| | | | | |
|---|---|---|---|---|
| 4,319,106 A | * | 3/1982 | Armitage | H01H 13/58 |
| | | | | 200/526 |
| 4,495,391 A | * | 1/1985 | Kitao | H01H 15/102 |
| | | | | 200/284 |
| 5,178,265 A | * | 1/1993 | Sepke | H01H 13/58 |
| | | | | 200/528 |
| 2017/0243706 A1 | * | 8/2017 | Yoshida | H01H 13/585 |

OTHER PUBLICATIONS

Database WPI, Week Apr. 2012, Thomson Scientific, London, GB; AN 2012-A32433 XP002778745, -& CN 102 280 290 A (Suzhou Nuofo Electrical Appliance Co Ltd) Dec. 14, 2011 (Dec. 14, 2011) * abstract (2 pgs).

* cited by examiner

APPARATUS AND METHODS FOR LATCHING, AND SYSTEMS INCLUDING THE SAME

RELATED APPLICATIONS

This patent claims priority to Taiwanese Patent Application No. 105133170, filed Oct. 14, 2016, entitled "APPARATUS AND METHODS FOR LATCHING, AND SYSTEMS INCLUDING THE SAME." The entirety of Taiwanese Patent Application No. 105133170 is incorporated herein by reference.

FIELD

The present disclosure is related to latching apparatus, methods for switching the latching apparatus, and switch system.

BACKGROUND

Push-button switches typically to have loosened components in design. Even under a latching state, the top button portions of these switches are movable, and are apt to fall apart from the switch. In case such types of switches are installed in a variety of directions to a device, or on a device with a changeable orientation, the users usually cannot assure whether or not the switches are in the latching state. In addition, the push-button switches are often designed with a single bolt structure inside for latching. When being pressed on, the force might be uneven or too hard, so as to skew or even break the bolt structure and make the button stuck at a wrong position. These kinds of bolt structures will easily damage the internal components, and affect the reliability of the switch. Therefore, the present disclosure is aimed at resolving the above drawbacks, and significantly improves the reliabilities of the latching apparatus.

SUMMARY

The present disclosure provides a latching apparatus, a switch system including the latching apparatus, and a method for switching the latching apparatus. In some embodiments, the latching apparatus may include an actuator configured to change from a first position to a second position; a core connector coupled to the actuator at a first end, and having a cam disposed thereon; and a follower located between the actuator and the cam. The actuator may push the follower when changing from the first position to the second position, such that the follower engages with the cam on the core connector and causes the cam to rotate an angle to enter a latching state. During the latching state, the core connector may be configured to hold the actuator secured at the second position.

In another aspect, the switch system of the present disclosure may include a latching apparatus, including: an actuator configured to change from a first position to a second position; a core connector coupled to the actuator at a first end, and having a cam disposed on a second end opposing the first end; and a follower located between the actuator and the cam; and a control element coupled to the second end of the core connector of the latching apparatus. The actuator may push the follower when changing from the first position to the second position, such that the follower engages with the cam on the core connector and causes the cam to rotate an angle, and the latching apparatus may adjust the control element through the core connector to enter a latching state. During the latching state, the core connector may be configured to hold the actuator secured at the second position.

Yet in another aspect, the method for switching the latching apparatus of the present disclosure may include: pressing an actuator to change the actuator from a first position to a second position; moving a follower through the actuator, such that the follower engages with a cam on a core connector and causes the cam rotates an angle to enter a latching state, wherein the core connector is coupled to the actuator at a first end and having the cam disposed on a second end opposing the first end; and holding the actuator secured at the second position by the core connector being coupled to the actuator.

The above and other aspects of the present disclosure are described in more details in the following contexts.

BRIEF DESCRIPTION OF THE DRAWINGS

So that the manner in which the above described features of the present disclosure can be understood, a more specific description of the disclosure, briefly summarized above, may be had by reference to embodiments, some of which are illustrated in the appended drawings. However, the appended drawings illustrate only exemplary embodiments of this disclosure. It is to be understood that the disclosure may admit to other equally effective embodiments, and therefore the appended drawings should not be considered as limiting the scope of the present disclosure.

To facilitate understanding, identical reference numerals have been used, where possible, to designate identical elements that are common in the figures. For the sake of clarity, the various embodiments shown in the figures are not necessarily drawn to scale and are illustrative representations.

DETAILED DESCRIPTION

Now the embodiments of the present disclosure will be described in details with reference to the drawings.

Figure 1:
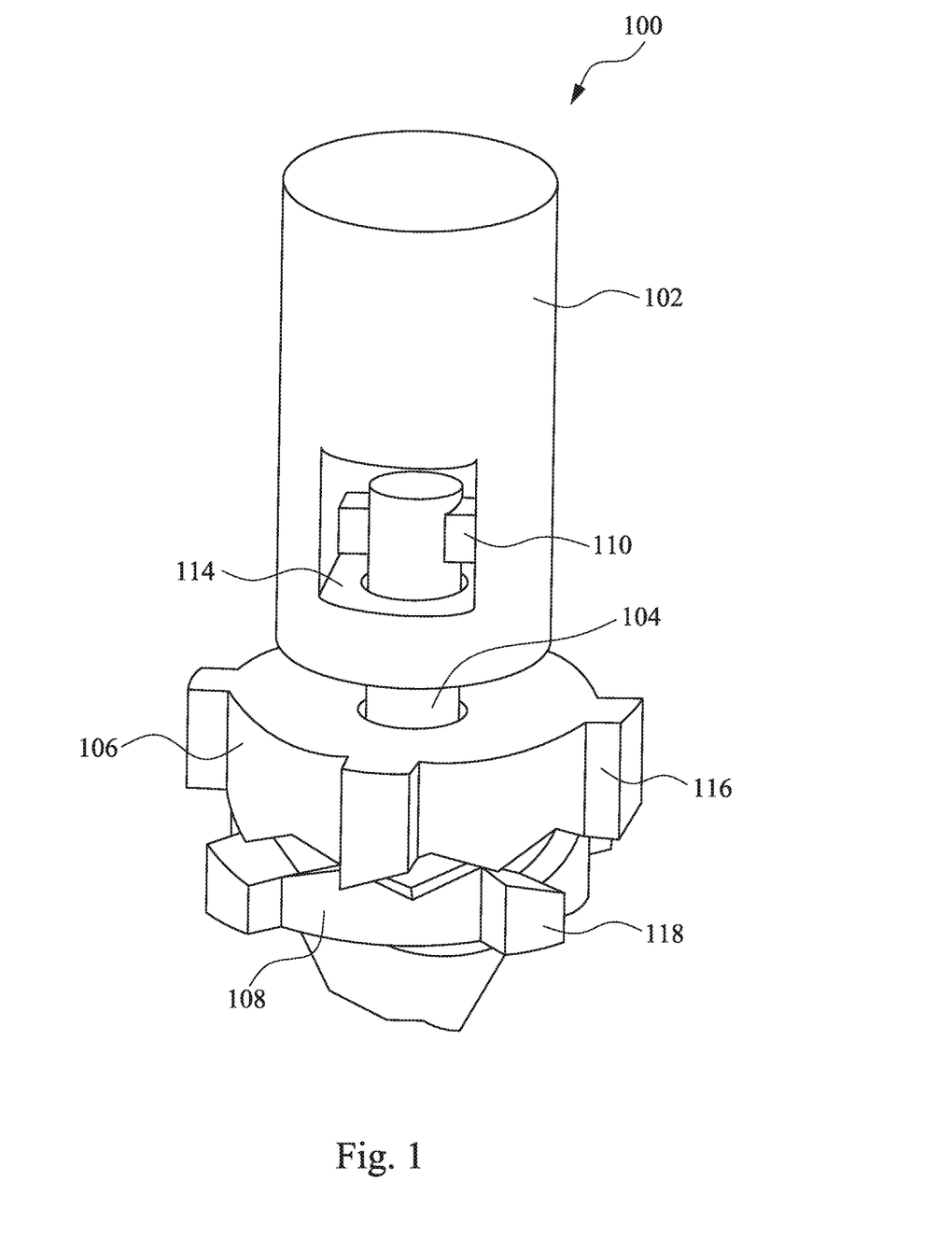
FIG. 1 illustrates a schematic perspective view of a latching apparatus according to an embodiment of the present disclosure.

FIG. 1 illustrates a schematic perspective view of the latching apparatus according to an embodiment of the present disclosure. As shown in FIG. 1, the latching apparatus 100 may include an actuator 102, a core connector 104 coupled to the actuator 102, a follower 106 disposed between the actuator 102 and the core connector 104, and a cam 108 disposed on the core connector 104.

The actuator 102 can be moved between a first position as an open state and a second position as a latching state. In some embodiments, the actuator 102 may be a piston or a trigger, which can be functioned as a button or a switch. In the embodiment as shown, the actuator 102 is a hollowed cylinder with surrounding inner wall forming an inner region. Further, a hole is formed at the bottom of the actuator 102 and being communicated with the inner region, such that the upper end of the core connector 104 may pass through the hole and accommodate within the inner region. In some embodiments, the hole are designed to have a smaller diameter than the inner wall of the actuator 102, such that at least a portion of the bottom wall 114 remains surrounding the inner region of the actuator 102. In some embodiments, the actuator 102 can be made of plastic, carbon fiber, polymer, or other similar materials. In certain embodiments, at least a portion of the actuator 102 can be formed of metal or conductive materials. For example, at least a portion of the inner wall or the bottom wall of the actuator can be formed of metal.

The core connector 104 is configured to be coupled with the actuator by extending the upper end through the hole at the bottom of the actuator 102, and entering the inner region of the actuator 102. In the embodiment as shown, the upper end of the core connector 104 is configured to have protrusions 110 at two sides opposing to each other. The width of the protrusions 110 may exceed the diameter of the hole at the bottom of the actuator 102, such that the actuator 102 can be secured atop the core connector 104 by these protrusions 110 and will not easily fall apart. It should be understood that although FIG. 1 shows two protrusions 110 being disposed at the upper end of the core connector 104, other numbers or shapes of protrusions are also considered for connection.

In some embodiments, the core connector 104 can be made of plastic, carbon fiber, polymer, or other similar materials. In certain embodiments, at least a portion of the core connector 104 can be formed of metal or conductive materials, such that the contact between the portions of the conductive materials within the core connector 104 and the actuator 102 is able to form electrical connection.

The follower 106 is disposed between the actuator 102 and the core connector 104, and matches to the cam 108 being disposed at the lower end of the core connector 104. In the embodiment as shown, the follower 106 is a ring encircling the core connector 104, and has bumps 116 extending outward from the peripheral. During operation, these bumps 116 will fit to the housing of the latching apparatus 100, such that the follower 106 could only move up and down on the core connector 104 without rotating. In the embodiment as shown, four bumps 116 are disposed around the peripheral of the follower 106. However, one should understand that other numbers of bumps are also considered.

Figure 2:
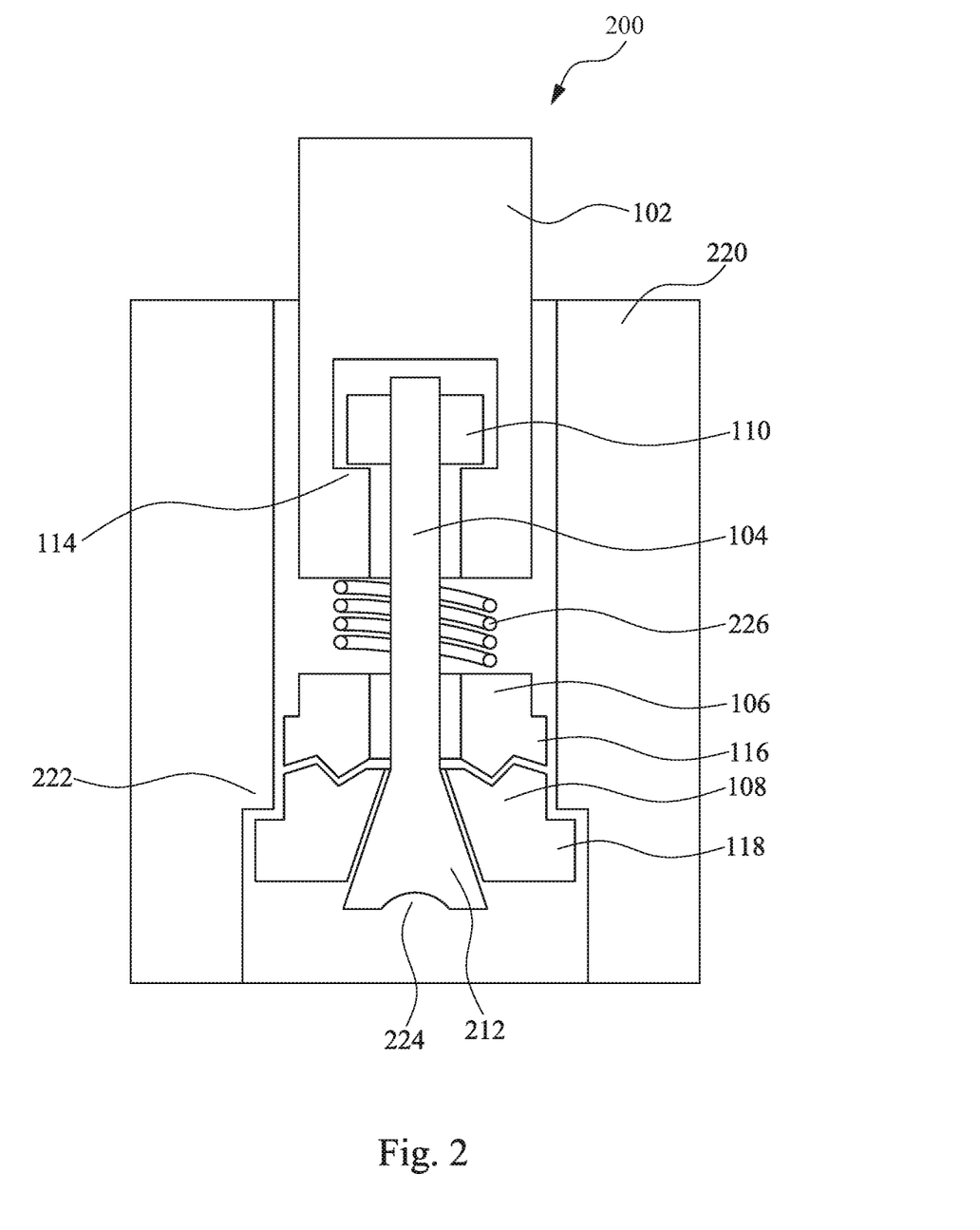
FIG. 2 illustrates the latching apparatus according to an embodiment of the present disclosure, which can be applied to a push-button switch.

The annular bottom of the follower 106 is disposed with serrated structure, which will match with the cam 108 at the lower end of the core connector 104. In some embodiments, the lower end of the core connector 104 is configured with an annular surface extending outwardly. As shown in FIG. 2, an angle is formed from the core connector 104 to the outwardly extending annular surface 212, such that the lower end of the core connector 104 has a tapered shape. A hole is also disposed at the center of the cam 108, such that the cam 108 encircles the core connector 104 on the annular surface 212. Under such configuration, the cam 108 will not easily fall apart from the core connector 104 during operation, and may rotate smoothly on the core connector 104. Bumps 118 can also be disposed around the cam 108, such that the cam 108 may abut against the housing during latching state.

Further with reference to FIG. 2, the latching apparatus according to the embodiment of the present disclosure can be applied to a push-button switch 200.

The push-button switch 200 may have a housing 220 surrounding the core connector 104 and the actuator 102. As described above, the inner surface of the housing 220 may have vertically spaced grooves, such that the bumps 116 of the follower 106 will fit in these grooves to constrain the movement of the follower 106 along the axis of the core connector 104 without rotation. In addition, the inner surface of the housing 220 further includes stop 222, which contacts the bumps 118 of the cam 108 during the latching state, so as to maintain the latching state on the latching apparatus.

In some embodiments, the stop 222 on the housing may have different height while contacting the bumps 118 of the cam 108. As such, the push-button switch 200 can be latched at different levels.

As shown in FIG. 2, in this exemplary push-button switch 200, the lower end of the core connector 104 is designed with an indent 224. This indent 224 is configured to be connected to other control elements. For example, if the push-button switch 200 is functioned as an electrical switch, the control element connected at the lower end of the connector 104 may control the on and off of the electric current. In another embodiment, the control element may be functioned as a valve for controlling the flow of liquid or gas. In other embodiments, the control elements may be mechanical structures which provide a variety of applications, such as a starter, a counter, a piston, a detector, etc.

In the embodiment shown in FIG. 2, an elastic member 226 (such as a spring) can be disposed tween the actuator 102 and the follower 106. This elastic member 226 may provide a counterforce to push the bottom wall 114 in the inner region of the actuator 102 against the protrusions 110 of the core connector 104. Further, for the counterforce provided from the elastic member 226 to the actuator 102, such counterforce may enhance the user's tactility while pressing on the push-button switch 200.

In some embodiments, the core connector 104 may be an extendable structure or has a plurality of elements being linked together. As such, when the push-button switch 200 is in the open state, the counterforce provided from the elastic member 226 to the actuator 102 will force the core connector 104 to stretch and raises the actuator 102 higher, so as to expressivity present the open state of the push-button switch 200.

With reference to FIG. 2, the operation of the push-button switch 200 will be further explained as follows. In case that the actuator 102 of the push-button switch 200 is being pressed, the actuator 102 will push the follower 106 to force the flower 106 on the core connector 104 moves downward along the axis. Next, the serrated structure at the bottom of the follower 106 engages with the cam 108, such that the cam 108 may rotate an angle on the annular surface 212 of the core connector 104 while moving downward. The rotation of the cam 108 makes the peripheral bumps 118 of the cam 108 contact with the stop 222 of the housing 220, and enters the latching state. At this moment, the core connector 104 is pulled by the cam 108 and also moves downward. Consequently, the protrusions 110 at the upper end of the core connector 104 will contact the bottom wall 114 at the inner region of the actuator 102, such that the actuator 102 is held secured at the second position, and cannot slide or fall apart. As such, the user may easily recognize the state of the push-button switch 200 according to the specific position presented by the actuator 102.

While changing to the latching state, the control element connected under the core connector 104 is able to switch its function due to the downward shifting of the core connector.

As described above, in the embodiment where at least a portion of the actuator 102 and the core connector 104 is made of metal or conductive material, an additional indicator (not shown) can be electrically connected to the actuator 102 and/or core connector 104. As such, the indicator, for example, may be turned on by the contact between the protrusions 110 of the core connector 104 and the actuator 102 during the latching state, so as to clearly indicate that whether the push-button switch 200 is in the latching state. In other embodiments, different types of indicator can be disposed. Alternatively, the different contact areas between the core connector 104 and the actuator 102 may be able to adjust the different outcomes revealed by the indicator.

After the push-button switch 200 is switched to the latching state, the user may again press the actuator 102 of the push-button switch 200 to push the follower 106 further downward by the actuator 102, such that the follower 106 will move downward along the axis of the core connector 104. Then, the serrated structure at the bottom of the follower 106 again engages with the cam 108, such that the cam 108 rotates another angle, causing the peripheral bumps 118 of the cam 108 to separate from the stop 222. As the cam 108 disengages from the stop 222, the control element connected at the lower end of the core connector 104 may provide a counterforce to push the actuator 102 upward and restore the actuator 102 back to the first position as the open state.

Figure 3:
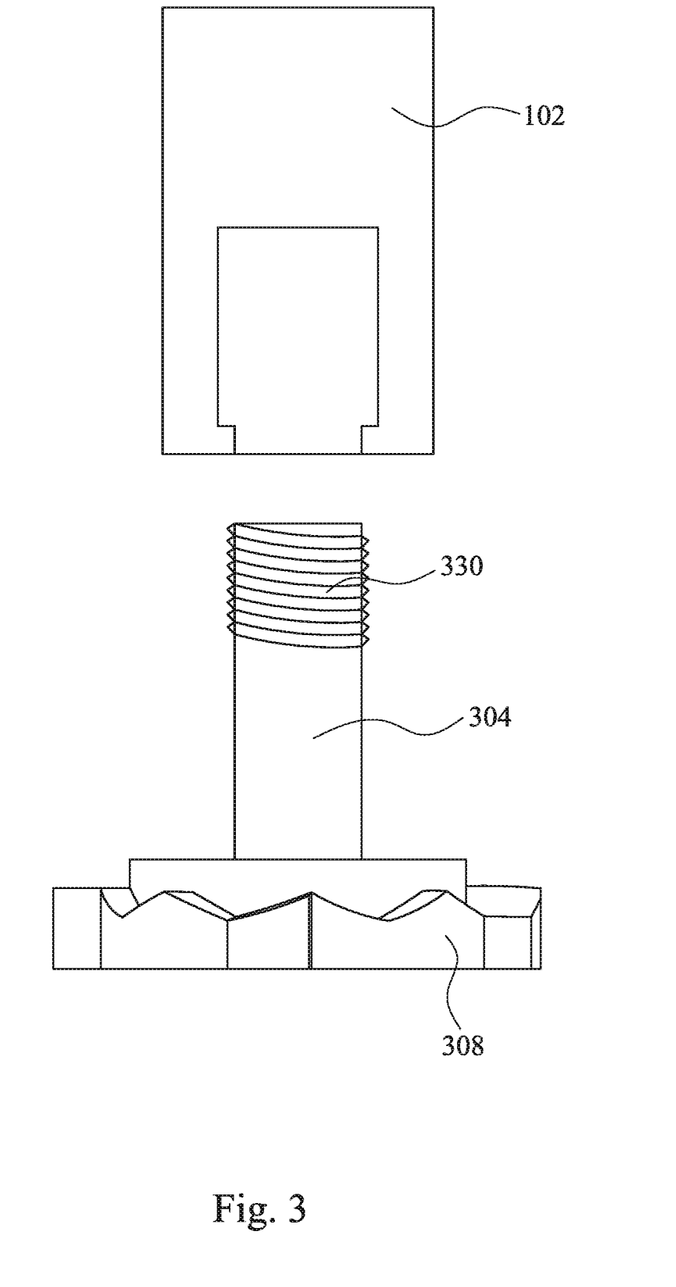
FIG. 3 illustrates a connection example between the core connector and the actuator of the latching apparatus according to an embodiment of the present disclosure.

FIG. 3 illustrates a connection example between the core connector 304 and the actuator 102 according to an embodiment of the present disclosure. As shown in FIG. 3, the core connector 304 can be connected to or integrated with the cam 308, such that the rotation of the cam 308 will also cause the core connector 304 to be rotated. Moreover, in the embodiment shown in FIG. 3, the upper end of the core connector 304 can be designed with threads 330. As such, the threads 330 at the upper end of the core connector 304 can be screwed into the bottom hole of the actuator 102, and accommodate inside the inner region of the actuator 102. During the latching state, the threads 330 at the upper end of the core connector 304 may hold the actuator 102 secured in the second position as the latching state, so as to keep the actuator 102 from sliding or falling apart, due to the larger diameter of the threads 330 than the hole at the bottom of the actuator 102.

Figure 4:
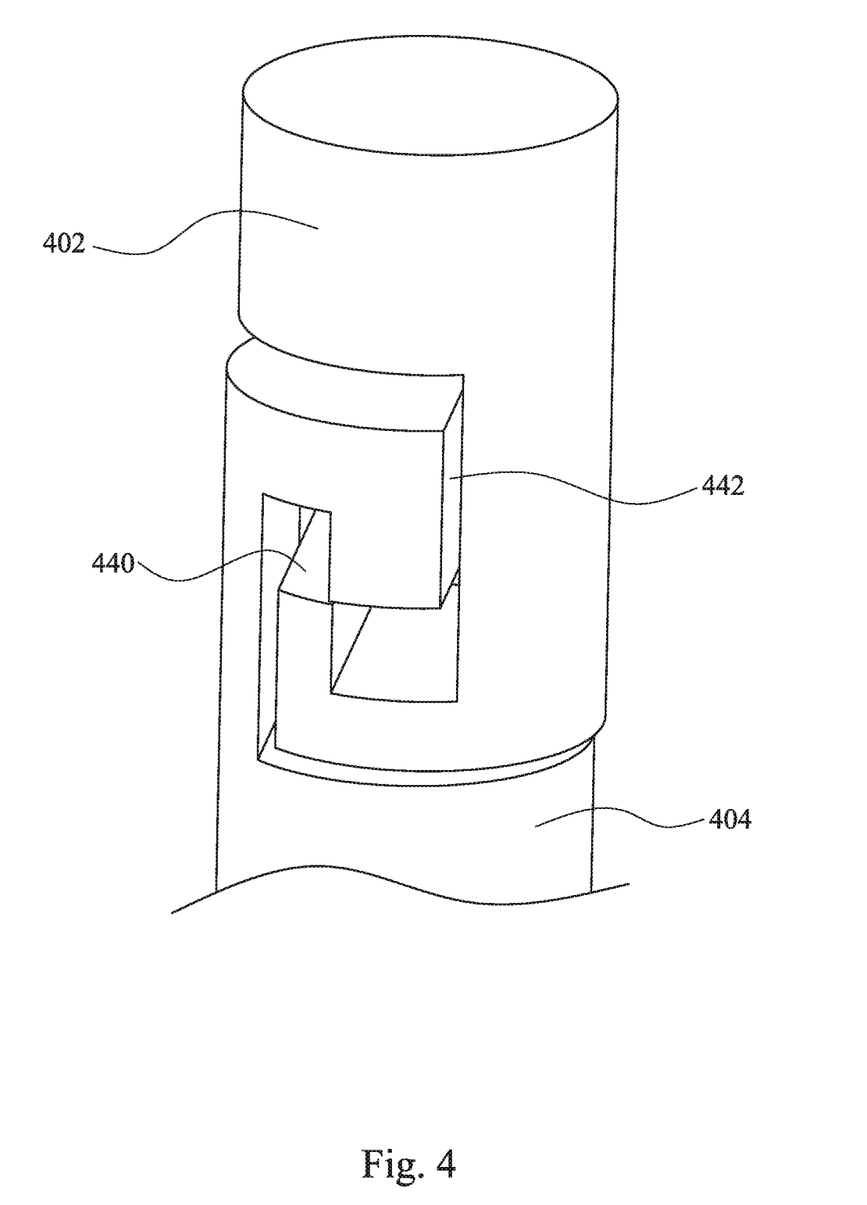
FIG. 4 illustrates another connection example between the core connector and the actuator of the latching apparatus according to an embodiment of the present disclosure.

FIG. 4 illustrates another connection example between the core connector 404 and the actuator 402 according to an embodiment of the present disclosure. As shown in FIG. 4, the actuator 402 can be designed as a hook structure 440 extending downwardly, whereas the upper end of the core connector 404 may have a corresponding hook structure 442 extending upwardly. As such, the actuator 402 and the core connector 404 will be hooked together during the latching state, so as to hold the actuator 402 secured in the second position as the latching state, and keep the actuator 402 from sliding or falling apart.

Figure 5:
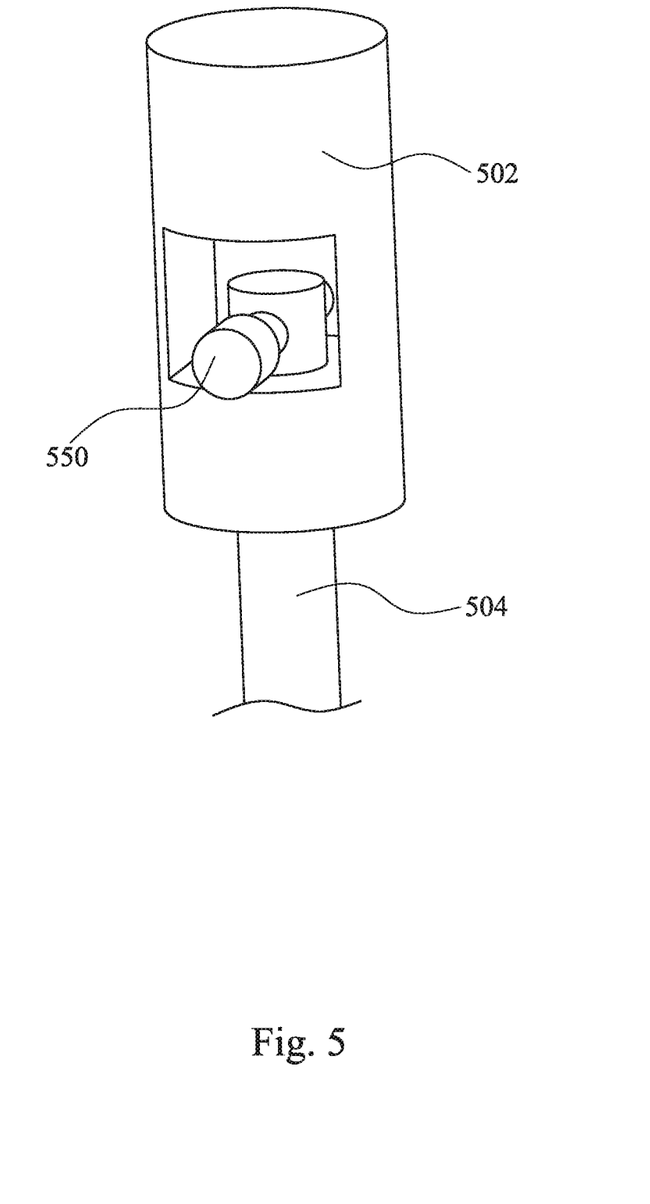
FIG. 5 illustrates still another connection example between the core connector and the actuator of the latching apparatus according to an embodiment of the present disclosure.

FIG. 5 illustrates still another connection example between the core connector 504 and the actuator 502 according to an embodiment of the present disclosure. As shown in FIG. 5, at least an opening can be disposed on the side wall of the actuator 502, and a through hole can be formed at the upper end of the core connector 504. When the upper end of the core connector 504 is accommodated in the inner region of the actuator 502, a pin 550 may be inserted into the through hole of the core connector 504 via the opening of the actuator 502. As such, the pin 550 will constrain the movement of the actuator 502 during the latching state, so as to hold the actuator 502 secured in the second position as the latching state, and keep the actuator 502 from sliding or falling apart.

Figure 6:
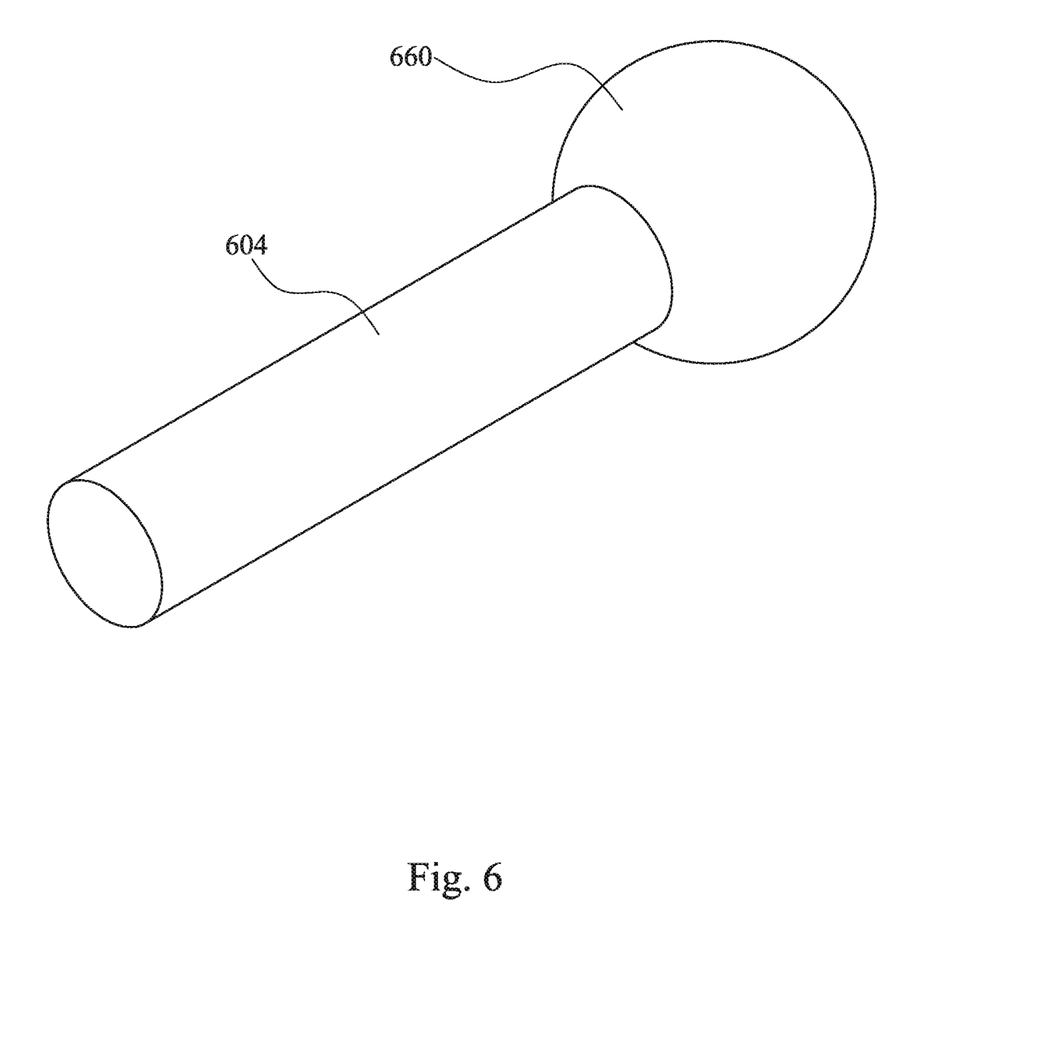
FIG. 6 illustrates yet another connection example between the core connector and the actuator of the latching apparatus according to an embodiment of the present disclosure.

FIG. 6 illustrates yet another connection example between the core connector 604 and the actuator according to an embodiment of the present disclosure. As shown in FIG. 6, the upper end of the core connector 604 can be designed as a ball 660, and may be snap fitted into the hole at the bottom of the actuator. In another embodiment, the ball 660 at the upper end of the core connector 604 may be flexible, such that the ball 660 can be deformed and squeezed through the hole at the bottom of the actuator. Under such configuration, the ball 660 will be tightly fitted in the inner region of the actuator during the latching state, such that the actuator 502 can be secured in the second position as the latching state without sliding or falling apart.

In addition, there are many different ways of the connections between the actuator and the core connector. For example, the couplings between the actuator and the core connector may include, but not limited to, magnetic connection, piston connection, vacuum chuck, glued connection, and elastic connection, or any other ways which may hold the actuator secured in the second position as the latching state.

Figure 7:
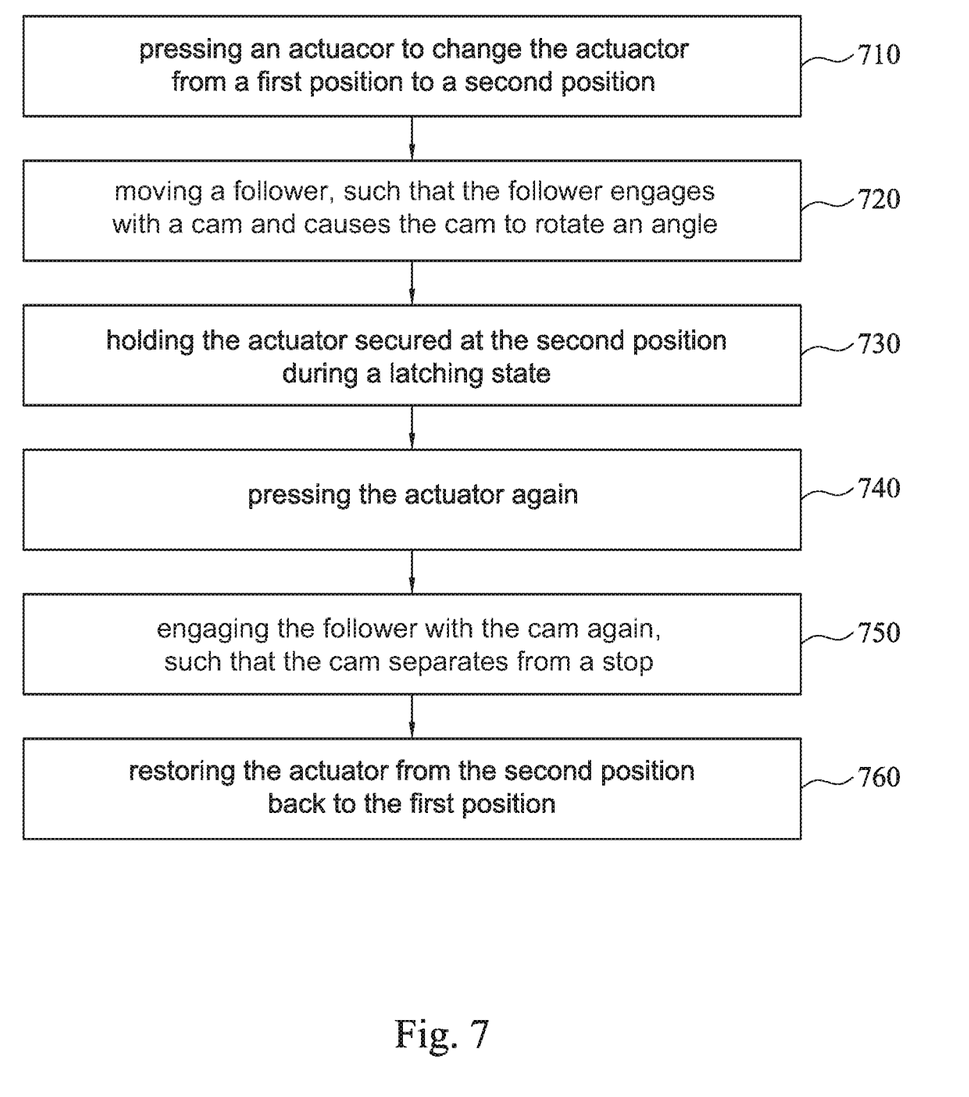
FIG. 7 illustrates a flow chart of a method for operating the latching apparatus according to an embodiment of the present disclosure.

FIG. 7 is a flow chart of a method for operating the latching apparatus according to an embodiment of the present disclosure. In step 710, the actuator is pressed, such that the actuator is changed from the first position to the second position. In step 720, the follower is moved by the actuator, such that the follower engages with the cam on the core connector and causes the cam to rotate an angle to enter the latching state. As the cam rotates by such angle, the bumps disposed on the cam will contact with the stop on the inner surface of the housing, such that the cam abuts against the stop on the housing. In step 730, the actuator is secured at the second position by the coupling between the core connector and the actuator within the inner region. Therefore, the actuator held in the second position will not slide or fall apart. Moreover, due to the matching between the core connector and the actuator, the pressure on the latching apparatus will be spread more evenly to keep each component from damage. As such, the lifetime and the reliabilities of the latching apparatus are significantly improved.

In some embodiments, the latching apparatus may further dispose a restorer, which is coupled to the lower end of the core connector. In step 740, when the latching apparatus receive another pressing force again during the latching state, the actuator will move the follower. Then in step 750, the follower again engages with the cam on the core connector, causing the cam to rotate another angle. At this moment, the bumps on the cam separate from the stop on the inner surface of the housing. Therefore, in step 760, the restorer provides a counterforce to the core connector to restore the actuator back to the open state. In some embodiments, the restorer may be an elastic member (such as spring), a piston, or another cam.

Exemplary embodiments of the present disclosure have been described with reference to the drawings. However, it will be apparent to those skilled in the art that various modifications and alterations can be made to the present disclosure without departing from the scope and spirit as defined by the appended claims.

What is claimed is:

1. A latching apparatus, comprising:
    an actuator configured to change from a first position to a second position;
    a core connector coupled to the actuator at a first end, and having a cam disposed thereon; and
    a follower located between the actuator and the cam,
    wherein the actuator pushes the follower when changing from the first position to the second position, such that the follower engages with the cam on the core connector and causes the cam to rotate an angle to enter a latching state, wherein during the latching state, the core connector configured to hold the actuator secured at the second position.

2. The latching apparatus according to claim 1, further comprising a housing surrounding the core connector with a stop disposed on an inner surface of the housing, wherein the cam of the core connector abuts against the stop on the housing during the latching state.

3. The latching apparatus according to claim 1, wherein the core connector has a second end opposing the first end with an annular surface extending radially and outwardly from a center axis of the core connector, such that the cam rotates the angle on the annular surface when the follower engages with the cam of the core connector.

4. The latching apparatus according to claim 1, wherein the first end of the core connector at least partially extends to an inner region of the actuator, and the first end of the core connector comprises at least one protrusion, wherein the at least one protrusion secures the actuator to hold the actuator at the second position during the latching state.

5. The latching apparatus according to claim 4, further comprising an elastic member disposed between the actuator and the follower to apply a counterforce to the actuator, such that the actuator contacts with the at least one protrusion of the core connector.

6. The latching apparatus according to claim 4, wherein the at least one protrusion of the core connector is formed of a conductive material, and at least a portion of an inner surface of the actuator is formed of the conductive material, such that the at least one protrusion contacts with the portion formed of the conductive material only when the actuator is located at the second position.

7. The latching apparatus according to claim 6, further comprising an indicator electrically connected to the at least one protrusion of the core connector.

8. The latching apparatus according to claim 4, wherein the core connector has a second end opposing the first end, and the cam is mounted on the second end of the core connector or integrated with the second end of the core connector, such that the core connector and the cam together rotates the angle when the follower engages with the cam of the core connector.

9. The latching apparatus according to claim 1, wherein the first end of the core connector at least partially extends to an inner region of the actuator, and the first end of the core connector comprises a structure selected from the group consisting of: a screw, a hook, a pin, and a ball.

10. A switch system, comprising:
    a latching apparatus, comprising:
        an actuator configured to change from a first position to a second position;
        a core connector coupled to the actuator at a first end, and having a cam disposed on a second end opposing the first end; and
        a follower located between the actuator and the cam; and
    a control element coupled to the second end of the core connector of the latching apparatus,
    wherein the actuator pushes the follower when changing from the first position to the second position, such that the follower engages with the cam on the core connector and causes the cam to rotate an angle, and the latching apparatus adjusts the control element through the core connector to enter a latching state, wherein during the latching state, the core connector is configured to hold the actuator secured at the second position.

11. The switch system according to claim 10, further comprising a housing surrounding the latching apparatus with a stop disposed on an inner surface of the housing, wherein the cam of the core connector abuts against the stop on the housing during the latching state.

12. The switch system according to claim 10, wherein the first end of the core connector at least partially extends to an inner region of the actuator, and the first end of the core connector comprises at least one protrusion, wherein the at least one protrusion secures the actuator to hold the actuator at the second position during the latching state.

13. The switch system according to claim 10, wherein the core connector is made of a conductive material, and further comprising an indicator electrically connected to the core connector made of the conductive material, wherein the indicator is conducted only when the actuator of the latching apparatus is in the second position.

14. The switch system according to claim 10, wherein the control element is a conductive switch or a fluid valve.

15. A method for switching a latching apparatus, comprising:
    pressing an actuator to change the actuator from a first position to a second position;
    moving a follower through the actuator, such that the follower engages with a cam on a core connector and causes the cam to rotate an angle to enter a latching state, wherein the core connector is coupled to the actuator at a first end and has the cam disposed on a second end opposing the first end; and
    holding the actuator secured at the second position by the core connector being coupled to the actuator.

16. The method according to claim 15, further comprising: activating an indicator via connections between the actuator and the core connector when the actuator is at the second position.

17. The method according to claim 15, wherein the step of moving the follower comprising: moving the follower through an elastic member disposed between the actuator and the follower.

18. The method according to claim 15, further comprising: abutting the cam against a stop of a housing after the cam being rotated by the angle, so as to enter the latching state, wherein the housing surrounds the core connector.

19. The method according to claim 18, further comprising:
    pressing the actuator when it is at the second position, such that the actuator moves the follower again;
    engaging the follower with the cam on the core connector and causing the cam to rotate another angle, such that the cam leaves the stop of the housing; and
    restoring the actuator from the second position back to the first position.

20. The method according to claim 19, wherein the restoration of the actuator from the second position back to the first position is performed by a restorer coupled to the second end of the core connector.

\* \* \* \* \*